United States Patent [19]

Garavaglia et al.

[11] Patent Number: 4,659,286
[45] Date of Patent: Apr. 21, 1987

[54] MAIN HELICOPTER DRIVE

[75] Inventors: Attilio Garavaglia, Gallarate; Enrico Sironi, Macario; Rinaldo Gonzato, Cassano Magnago, all of Italy

[73] Assignee: Costruzioni Aeronautiche Giovanni Agusta S.p.A., Italy

[21] Appl. No.: 733,487

[22] Filed: May 10, 1985

[30] Foreign Application Priority Data

May 14, 1984 [IT] Italy .................................. 484 A/84

[51] Int. Cl.⁴ .............................................. B64C 27/12
[52] U.S. Cl. ................................ 416/170 R; 416/123; 74/665 GC; 192/47
[58] Field of Search ........... 416/169 R, 169 A, 170 R, 416/170 B, 123, 124, 125, 126, 127, 128, 129, 130; 74/665 GC, 665 GA; 192/47; 244/60

[56] References Cited

U.S. PATENT DOCUMENTS

| | | | |
|---|---|---|---|
| 2,113,512 | 4/1938 | Kesterton | 192/47 |
| 2,383,295 | 8/1945 | Dodge | 192/47 |
| 3,907,083 | 9/1975 | Nieder | 192/47 |
| 4,046,238 | 9/1977 | Mendoza-Orozco | 192/47 |
| 4,093,049 | 6/1978 | Watson et al. | 192/47 |
| 4,230,211 | 10/1980 | Goto et al. | 192/47 |
| 4,284,183 | 8/1981 | Brisabois et al. | 192/47 |
| 4,456,425 | 6/1984 | McCarty et al. | 416/170 R |
| 4,531,620 | 7/1985 | Stone | 192/47 |

FOREIGN PATENT DOCUMENTS

| | | | |
|---|---|---|---|
| 2354922 | 1/1978 | France | 416/170 B |
| 549614 | 6/1977 | U.S.S.R. | 192/47 |

*Primary Examiner*—Everette A. Powell, Jr.
*Attorney, Agent, or Firm*—Kane, Dalsimer, Kane, Sullivan and Kurucz

[57] ABSTRACT

Main helicopter drive for transmitting drive to the countershaft even when the main shaft connected to the rotor is idle, and on which a sleeve, turned by a drive shaft and connected by gears to the countershaft, supports in rotary and axially-sliding manner, an inner tubular body angularly integral with the main shaft; an actuator being connected to the said tubular body for moving it between a normal position, in which the said tubular body is connected to the said sleeve by a freewheel on the latter, and a position in which the said freewheel engages the outer casing of a bearing fitted on to the said tubular body.

5 Claims, 1 Drawing Figure

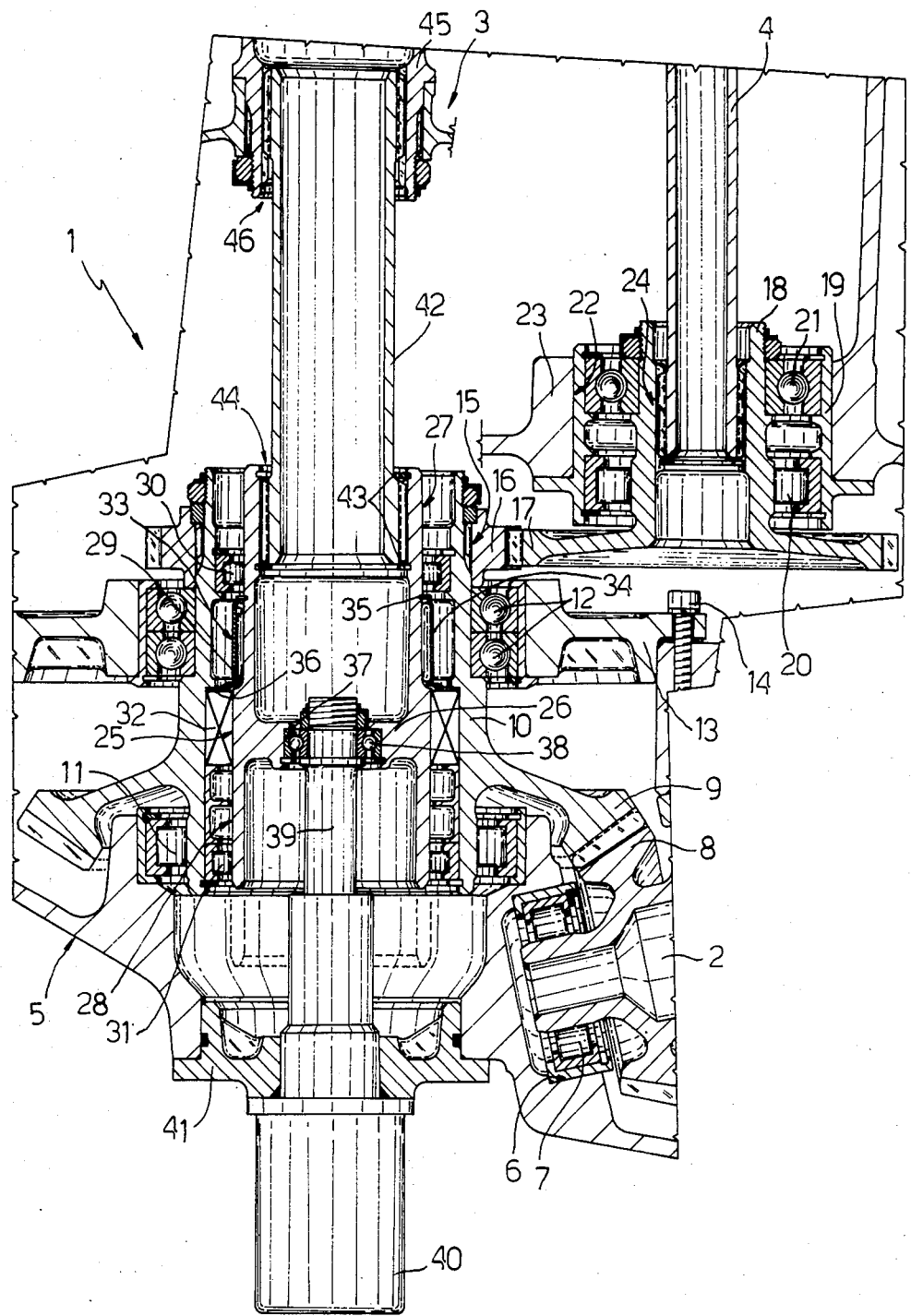

MAIN HELICOPTER DRIVE

BACKGROUND OF THE INVENTION

The present invention relates to a main helicopter drive. Helicopter drives are known to present an input connected to the drive shaft and an output connected to the main shaft powering the rotor. Drives of the aforementioned type generally present at least one more output connected to a duty or countershaft the function of which is to power the utilities and control systems on the helicopter, such as the hydraulic and electric systems.

One of the problems posed by drives of the aforementioned type is how to keep the countershaft running with the engine on and the rotor off. On known types of drives, this problem is generally solved using two coaxial tubular bodies, the first of which is fitted inside the second and angularly integral with the main shaft. The said second tubular body is designed to transmit the drive torque to the countershaft, on one side, by means of a gear train, and to the inner tubular body, on the other, by means of a freewheel designed to enable autorotation of the rotor and comprising internal locking members which may be controlled in such a manner as to impair operation, i.e. transmission of the drive torque to the main shaft. In addition to involving relatively complicated, highcost design, freewheels of the aforementioned type afford little reliability and constitute a critical part of the drive as a whole.

SUMMARY OF THE INVENTION

The aim of the present invention is to provide a helicopter drive designed to enable the countershaft to be powered even with the rotor off and the engine running, using an absolutely normal type of freewheel and involving no control of the said locking members.

With this aim in view, the present invention relates to a main helicopter drive comprising a tubular drive body and a tubular driven body supported in rotary manner round their own axes, actuating means connected angularly to the said tubular drive body, a freewheel fitted on to the said tubular drive body and connected to the said tubular driven body, and a main shaft and countershaft connected angularly one to the first and the other to the second of the said two tubular bodies, characterised by the fact that the said tubular driven body is fitted with a bearing adjacent to the said freewheel; the said tubular driven body having a cylindrical surface constituting a locking surface for the said freewheel and being connected in axially-sliding manner to the same; and actuating means being provided for enabling mutual axial displacement of the said tubular bodies between a first position, in which the said freewheel cooperates with the said locking surface, and a second position in which the said freewheel cooperates with the said bearing. The single FIGURE of the drawing shows a section of the helicopter drive transmission of the present invention.

DETAILED DESCRIPTION OF THE INVENTION

A non-limiting arrangement of the present invention will now be described with reference to the attached drawing showing a section with parts removed from clarity. Number 1 on the attached drawing indicates a main helicopter drive having an input drive shaft 2 and a number of outputs the first of which, 3, consists of a main rotor shaft, and the second of which, 4, consists of a countershaft for powering the utilities and controls on the helicopter.

Drive 1 is housed in a casing 5 having an outer seat 6 for bearings 7 supporting the end of drive shaft 2 fitted integral with input gear 8.

Through a side opening on casing 5, gear 8 engages a gear 9 extending from the mid part of a centre, cylindrical, tubular drive body or sleeve 10 coaxial with main shaft 3. Sleeve 10 is supported in rotary manner inside casing 5 by two supports arranged on opposite sides of gear 9, the first consisting of roller bearing 11 located between one end of sleeve 10 and casing 5, and the second consisting of a pair of ball bearings 12 located between sleeve 10 and an annular support 13 connected integral with casing 5 by screws 14.

One end of sleeve 10 projecting beyond annular support 13 in the direction of main shaft 3 is fitted, by means of splined coupling 15, with a gear 16 having its axis parallel with that of main shaft 3. Gear 16 meshes with gear 17 extending from the end of sleeve 18 mounted in rotary manner inside bush 19 by means of roller bearing 20 and ball bearing 21. Bush 19 is fitted firmly inside a hole 22 formed in wall 23 integral with casing 5. One end of countershaft 4, extending parallel with main shaft 3, is fitted inside sleeve 18 by means of splined coupling 24. Sleeve 10 is fitted inside with a tubular driven body 25 coaxial with drive sleeve 10 and having an intermediate, inner cross wall 26. Tubular body 25 is defined externally by two coaxial, cylindrical surfaces, 27 and 28, having different diameters and blended by an annular shoulder 29. The smaller-diameter surface 27 forms the inner race for the rollers of a first bearing 30 between body 25 and sleeve 10, whereas surface 28 forms both the inner race for the rollers of a second bearing 31 and the locking surface of an inner freewheel 32 fitted on to sleeve 10. Both freewheel 32 and bearing 31 are located between body 25 and sleeve 10.

Consequently, body 25 is connected coaxially and in both rotary and axially-sliding manner to sleeve 10 to which it may be connected angularly by means of freewheel 32. Surface 27 also forms the inner race for the rollers of bearing 33, the outer ring of which is defined by an annular casing 34 fitted against shoulder 29 by means of retaining ring 35 and having an outside diameter smaller than the inside diameter of ring 36 housing freewheel 32 axially.

Intermediate wall 26 presents a coaxial through hole 37 inside which is fitted, in rotary and axiall-fixed manner by means of bearing 38, the end of output shaft 39 on actuating unit 40, the latter being supported, by cap 41 on casing 5, coaxial with main shaft 3 and being designed to move body 25 coaxially between the normal operating position shown by the continuous line and the release position shown by the dotted line.

The end of body 25 opposite the end facing cap 41 accomodates a first segment 42 of main shaft 3. One end of segment 42 is secured to body 25 axially by two retaining rings 43 and angularly by splined coupling 44. At the other end, segment 42 is connected in sliding manner to a second axially-fixed segment 45 of shaft 3 by means of a telescopic splined coupling 46.

During flight, shaft 39 is in the withdrawn position shown on the attached drawing. Consequently, the torque transmitted from shaft 2 to sleeve 10 by gears 8 and 9 is transmitted to tubular body 25 and, therefore, to main shaft 3 by freewheel 32 and to sleeve 18 and, consequently, countershaft 4 by gears 16 and 17.

When, on the other hand, the engine is running with the helicopter on the ground and the rotor is required to remain idle, e.g. for heating on the ground, the actuator is operated so as to move body 25 into the position shown by the dotted line on the attached drawing. Such displacement of body 25 causes casing 34 to penetrate inside freewheel 32 through ring 36, thus preventing the drive torque from being transmitted by freewheel 32 and body 25. In like manner, sleeve 10 and, consequently, countershaft 4 may be kept turning while at the same time preventing rotation of main shaft 3, and with no need for replacing perfectly normal flywheel 32 with other highly complex, high-cost freewheels offering very little reliability.

We claim:

1. Main helicopter drive comprising a tubular drive body and a tubular driven body supported in rotary manner around their own axes, drive means connected angularly to the said tubular drive body, a flywheel fitted onto the said tubular drive body and connected to the said tubular driven body, and a main shaft and countershaft connected angularly to said tubular drive body and to said tubular driven body respectively, and a bearing fitted onto said tubular driven body in a position adjacent to said freewheel (32); the said tubular driven body (25) having a cylindrical surface (28) constituting a locking surface for the said freewheel (32) and being connected in axially-sliding manner to the freewheel (32); and actuating means (40) being provided for enabling mutual axial displacement of the said tubular bodies between a first position, in which the said freewheel (32) cooperates with the said locking surface (28), and a second position in which the said freewheel (32) cooperates with the said bearing (33).

2. A Drive according to claim 1, wherein said two tubular bodies (10, 25) are coaxial and arranged one inside the other.

3. A Drive according to claim 2, wherein said freewheel (32) is internal; the said tubular drive body (10) being arranged outside the said tubular driven body (25) and being connected angularly to the said main shaft (3) and the said drive means (2).

4. A Drive according to claim 1, wherein said actuating means (40) are connected to the said tubular driven body (25); the latter being connected angularly to the said main shaft (3).

5. A Drive according to claim 4, wherein said tubular driven body (25) is coaxial with the said main shaft (3); the latter comprising at least two segments (42, 45) the first of which is integral with the said tubular driven body (25) and the second of which is connected angularly to the first in telescopic manner.

* * * * *

UNITED STATES PATENT AND TRADEMARK OFFICE
CERTIFICATE OF CORRECTION

PATENT NO. : 4,659,286
DATED : April 21, 1987
INVENTOR(S) : ATTILIO GARAVAGLIA et al It is certified that error appears in the above-identified patent and that said Letters Patent is hereby corrected as shown below:

Page 1, Foreign Application Priority Data should read

--Italy...........67 484 A/84--.

Column 1, line 65 "from" should be --for--.

Column 3, line 14, "flywheel" should be --freewheel--.

Column 3, line 21, "flywheel" should be --freewheel--.

Signed and Sealed this

Eighteenth Day of August, 1987

Attest:

DONALD J. QUIGG

Attesting Officer

Commissioner of Patents and Trademarks